US012791100B2

(12) United States Patent
Peterson

(10) Patent No.: US 12,791,100 B2
(45) Date of Patent: Nov. 10, 2026

(54) BRUSH SEAL WITH CROSS-FLOW BACKING PLATE AND THERMAL GRADIENT REDUCTION METHOD

(71) Applicant: RTX Corporation, Farmington, CT (US)

(72) Inventor: Christopher Peterson, Roanoke, IL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/023,101

(22) Filed: Jan. 15, 2025

(65) Prior Publication Data

US 2026/0201957 A1 Jul. 16, 2026

(51) Int. Cl.
*F16J 15/3288* (2016.01)
*F01D 11/00* (2006.01)

(52) U.S. Cl.
CPC ......... *F16J 15/3288* (2013.01); *F01D 11/005* (2013.01); *F05D 2240/56* (2013.01); *F05D 2260/202* (2013.01)

(58) Field of Classification Search
CPC . F16J 15/3288; F01D 11/005; F05D 2240/56; F05D 2260/202
See application file for complete search history.

(56) References Cited

U.S. PATENT DOCUMENTS 6,170,831 B1 1/2001 Bouchard
6,428,009 B2 * 8/2002 Justak .................. F16J 15/3288 277/411
7,438,526 B2 * 10/2008 Enderby .............. F16J 15/3288 415/231
7,597,533 B1 10/2009 Liang
8,727,353 B2 5/2014 Addis
9,033,657 B2 * 5/2015 Gibson ................. F04D 29/057 415/231
11,549,588 B2 * 1/2023 Drake ..................... F01D 11/08
(Continued)

FOREIGN PATENT DOCUMENTS

EP 1013887 A1 6/2000
EP 3650657 B1 8/2021

OTHER PUBLICATIONS

European Search Report dated May 27, 2026 issued in corresponding application 26152167.8.

*Primary Examiner* — Nicholas L Foster
(74) *Attorney, Agent, or Firm* — Christopher B. Kilner; MILLEN, WHITE, ZELANO & BRANIGAN, P.C.

(57) ABSTRACT

A brush seal of a turbine engine may provide a cooling flow to a ceramic matrix composite (CMC) component that has a hot side exposed to a hot gas path and an opposing cold side. The brush seal includes an inner diameter (ID) backing plate providing a radial face seal across a cavity in the CMC component. The brush seal also includes an outer diameter (OD) backing plate, a plurality of brush seal bristles disposed between the ID and OD backing plates, and a hole extending through the brush seal to provide the cooling flow to the cavity of the CMC component. A cross-flow channel is disposed on an inner surface of the ID backing plate such that the cross-flow channel extends from an edge of the ID backing plate to the hole to pass leakage air to mix with the cooling flow and reduce an impingement cooling effect thereof.

10 Claims, 3 Drawing Sheets

(56) References Cited

U.S. PATENT DOCUMENTS

| | | | | |
|---|---|---|---|---|
| 11,959,422 | B2 | 4/2024 | Karanian et al. | |
| 12,546,230 | B1 * | 2/2026 | Peterson | F01D 5/186 |
| 12,595,744 | B1 * | 4/2026 | Peterson | F01D 11/003 |
| 12,624,641 | B1 * | 5/2026 | Smiddy | F01D 11/00 |
| 2006/0210392 | A1 | 9/2006 | Enderby | |
| 2007/0041827 | A1 | 2/2007 | Camus | |
| 2008/0203671 | A1 * | 8/2008 | Addis | F16J 15/3288<br>277/355 |
| 2013/0170979 | A1 | 7/2013 | Sha | |
| 2014/0023490 | A1 | 1/2014 | Hillier | |
| 2016/0312637 | A1 | 10/2016 | Duguay | |
| 2017/0292397 | A1 * | 10/2017 | Taniguchi | F01D 11/008 |
| 2018/0058234 | A1 | 3/2018 | Shinichi et al. | |
| 2019/0309856 | A1 * | 10/2019 | Drake | F16J 15/3288 |
| 2021/0254553 | A1 | 8/2021 | Caroline et al. | |

* cited by examiner

BRUSH SEAL WITH CROSS-FLOW BACKING PLATE AND THERMAL GRADIENT REDUCTION METHOD

FIELD OF THE INVENTION

The subject matter disclosed herein relates to providing cooling flow to ceramic matrix composite (CMC) components and, in particular, to providing a dedicated cooling flow ingress through a brush seal, but with a thermal gradient reduction on the CMC component using a cross-flow provided via a backing plate of the brush seal.

BACKGROUND OF THE INVENTION

Gas turbine engines or jet engines, in general, include a fan section, a compressor section, a combustion section, and a turbine section. Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Certain components of gas turbine engines are thus exposed to the high-energy, high temperature gas flow (flow path components). Therefore, it is desirable that such components be made of heat-resistant materials such as ceramic matrix composites (CMCs). CMC components can withstand much higher operating temperatures than components composed of superalloys. However, CMC components have comparably lower thermal conductivity. To increase their operational lifespans, precautions can be taken to cool CMC components by subjecting the components to a flow of cooling fluid (e.g., air).

To provide cooling of CMC components, secondary air flows, i.e., secondary to the main flow of high-energy, high temperature gas, can be used to cool components of the gas turbine engines that are exposed to high temperatures as well as to prevent high temperature gas from reaching those components that are not directly exposed to the hot gas flow. To facilitate the cooling of the CMC components, cavities or channels can be provided within the components themselves to allow secondary cooling air to flow from one region to another region of the turbine. For example, a component such as a blade outer air seal (BOAS) can be provided with an internal cooling cavity or channel to allow cooling air to flow to a region between the engine casing and the outer radial surface of the BOAS into the internal cooling cavity of the BOAS to cool the interior of the component and thereby reduce its thermal deterioration due to exposure to the hot gas path.

However, given the packaging constraints within a turbine engine, the sensitivity of CMC materials to machined features, and the manufacturing difficulties involved with providing cooling circuit components with non-machining techniques (e.g., casting-like processes and the like), feeding of the cooling flow to the internal cavity of the CMC component may be difficult.

Additionally, CMC BOAS (sometimes referred to as blade shrouds), CMC vane platforms, and the like require sealing to adjacent turbine components. These seals minimize leakage between stages and can often be in the form of axial brush seals. Brush seals are desirable seals to interfaces with CMC components due to their compliant nature and high temperature capability, but these axial brush seals can cover a portion of the BOAS and/or vane platform and impact the heat transfer at the covered locations. Furthermore, the brush seals can create additional challenges in directing cooling flows to regions of the platforms for film cooling at the covered locations.

The above information disclosed in this Background section is only for understanding of the background of the inventive concepts and, therefore, it may contain information that does not constitute prior art.

SUMMARY OF THE INVENTION

The present disclosure is directed, in a first aspect, to a brush seal for a ceramic matrix composite (CMC) component of a turbine engine, wherein the CMC component has a hot side configured for exposure to a hot gas path of the turbine engine and an opposing cold side. The brush seal includes an inner diameter (ID) backing plate configured to provide a radial face seal across a cavity in the CMC component, an outer diameter (OD) backing plate, a plurality of brush seal bristles disposed between the ID backing plate and OD backing plate, a hole extending through the OD backing plate, the brush seal bristles, and the ID backing plate and positioned to provide the cooling flow to the cavity of the CMC component, and a cross-flow channel disposed on an inner surface of the ID backing plate, the cross-flow channel extending from an edge of the ID backing plate to the hole.

In an embodiment of the brush seal, the hole may be round.

In another embodiment of the brush seal, the cross-flow channel may be machined into the inner surface of the ID backing plate.

In a further embodiment of the brush seal, the cross-flow channel may extend across a portion of the radial face seal.

In yet another embodiment of the brush seal, the cross-flow channel may be dimensioned to provide leakage air that leaks past the brush seal bristles.

In an embodiment of the brush seal, the cross-flow channel may be configured to cause the leakage air to transversely mix with cooling air from the hole to lower a heat transfer coefficient of the cooling air.

In another embodiment of the brush seal, the cavity forms a plenum that feeds a plurality of film cooling holes extending to the hot side of the CMC component.

In a further embodiment of the brush seal, the plenum may further feed a cooling flow for a mateface purge hole in the CMC component.

In yet another embodiment of the brush seal, the plenum may further feed a cooling flow for an additional cooling circuit in the CMC component or an adjacent CMC component.

In an embodiment of the brush seal, the brush seal may be configured to form the face seal against the CMC component selected from a CMC blade outer air seal (BOAS), a CMC vane platform, and a CMC combustion liner.

The present disclosure is also directed, in a second aspect, to a method of providing a cooling flow to a ceramic matrix composite (CMC) component of a turbine engine through a brush seal, wherein the CMC component has a hot side configured for exposure to a hot gas path of the turbine engine and an opposing cold side. The method includes providing at least one cavity in the CMC component, the at least one cavity having an entrance disposed on the cold side for receiving the cooling flow, disposing the brush seal adjacent the at least one cavity and the cold side of the CMC component to provide a radial face seal across the cavity of the CMC component with an inner diameter (ID) backing plate of the brush seal, passing the cooling flow from a source through a hole extending through the brush seal to provide the cooling flow to the at least one cavity of the CMC component, and passing leakage air that leaks through bristles of the brush seal to a cross-flow channel disposed on an inner surface of the ID backing plate, the cross-flow channel extending from an edge of the ID backing plate to the hole.

In an embodiment of the method, providing at least one cavity in the CMC component may include providing a film cooling supply plenum.

In another embodiment of the method, passing the leakage air through the cross-flow channel may cause mixing with the cooling flow passing through the hole to reduce an impingement cooling effect of the cooling flow in the cavity.

In a further embodiment of the method, the film cooling supply plenum may feed a plurality of film cooling holes extending to the hot side of the CMC component to provide film cooling.

In yet another embodiment, the method may include machining the cross-flow channel into an inner side of the ID backing plate of the brush seal prior to disposing the brush seal adjacent the at least one cavity.

In an embodiment, the method may include feeding cooling flow from the film cooling supply plenum to a mateface purge hole of the CMC component.

In another embodiment, the method may include feeding cooling flow from the film cooling supply plenum to another area of the CMC component and/or an adjacent region of the turbine engine.

The present disclosure is further directed, in a third aspect, to a cooling flow arrangement for a ceramic matrix composite (CMC) component of a turbine engine, wherein the CMC component has a hot side configured for exposure to a hot gas path of the turbine engine and an opposing cold side. The arrangement includes a cavity formed in the CMC component, the cavity having an entrance disposed on the cold side configured for receiving a cooling flow. The arrangement also includes a brush seal disposed adjacent the cavity and the cold side of the CMC component and configured to provide a radial face seal across the cavity of the CMC component, the brush seal further comprising a plurality of brush seal bristles configured to form a first seal against the CMC component, a hole extending through the central portion of the brush seal and positioned to provide the cooling flow to the cavity of the CMC component, and a cross-flow channel disposed on an inner surface of the brush seal to cross the radial face seal and extend to the hole.

In an embodiment of the cooling flow arrangement, the CMC component may be a CMC blade outer air seal (BOAS), a CMC vane platform, or a CMC combustion liner and the cavity may include elements selected from a plurality of film cooling holes extending from the cavity to the hot side of the CMC BOAS, at least one conduit leading to another portion of the CMC BOAS, at least one conduit leading to an adjacent region of the turbine engine, a conduit leading to a mateface purge hole, or combinations thereof.

In an embodiment of the cooling flow arrangement, the cross-flow channel may be machined into the inner surface of the brush seal and is dimensioned to pass leakage air to the cavity to mix with the cooling flow to reduce an impingement cooling effect of the cooling flow in the cavity.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
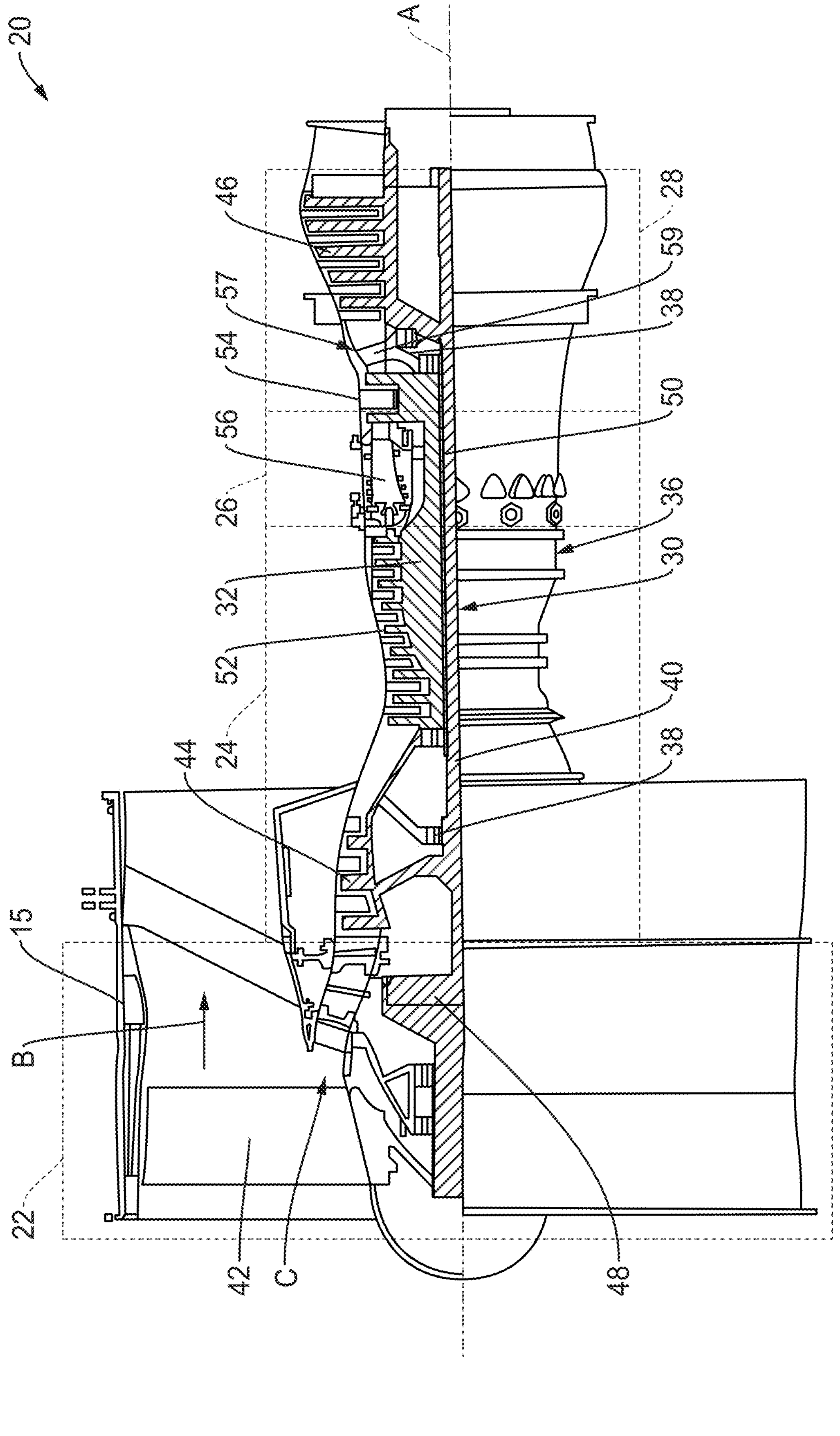
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an," and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior."

It will further be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

The present disclosure is directed to the provision of a cooling hole into a brush seal to enable cooling air to be supplied to gas path film cooling holes located in a ceramic matrix composite (CMC) component under the brush seal, but with a reduction in impingement cooling effects by introduction of a cross-flow of leakage air via a channel in an inner diameter (ID) backing plate of the brush seal. By reducing the impingement cooling effects of the supplied cooling air, thermal gradients within the CMC component may be reduced.

Indeed, such an orifice flow from the brush seal cooling hole may cause impingement cooling on non-gas path CMC surfaces of a film cooling supply plenum within the CMC component, and this jet impingement may reduce the temperatures of non-gas path CMC surfaces and cause undesirable thermal stress due to the resulting thermal gradients. In accordance with the present disclosure, this impingement cooling can be reduced with the cross-flow of leakage air to reduce the negative structural impact caused by the induced thermal gradient.

While the illustrated examples and discussion below often make reference to a blade outer air seal (BOAS), it should be recognized that the present disclosure is not limited thereto, but includes any CMC component for which a cooling cavity is desirable, for example, a vane platform, a combustion liner, and the like.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces into the flow of the hot gases, i.e., faces upstream. The trailing edge/portion of a structure is the edge/portion that the faces away from the flow of the hot gases, i.e., faces downstream.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofans engines and may be applied to other types of turbine engines.

Engine 20 generally includes a low speed spool 30 and a high-speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects, a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

Figure 2:
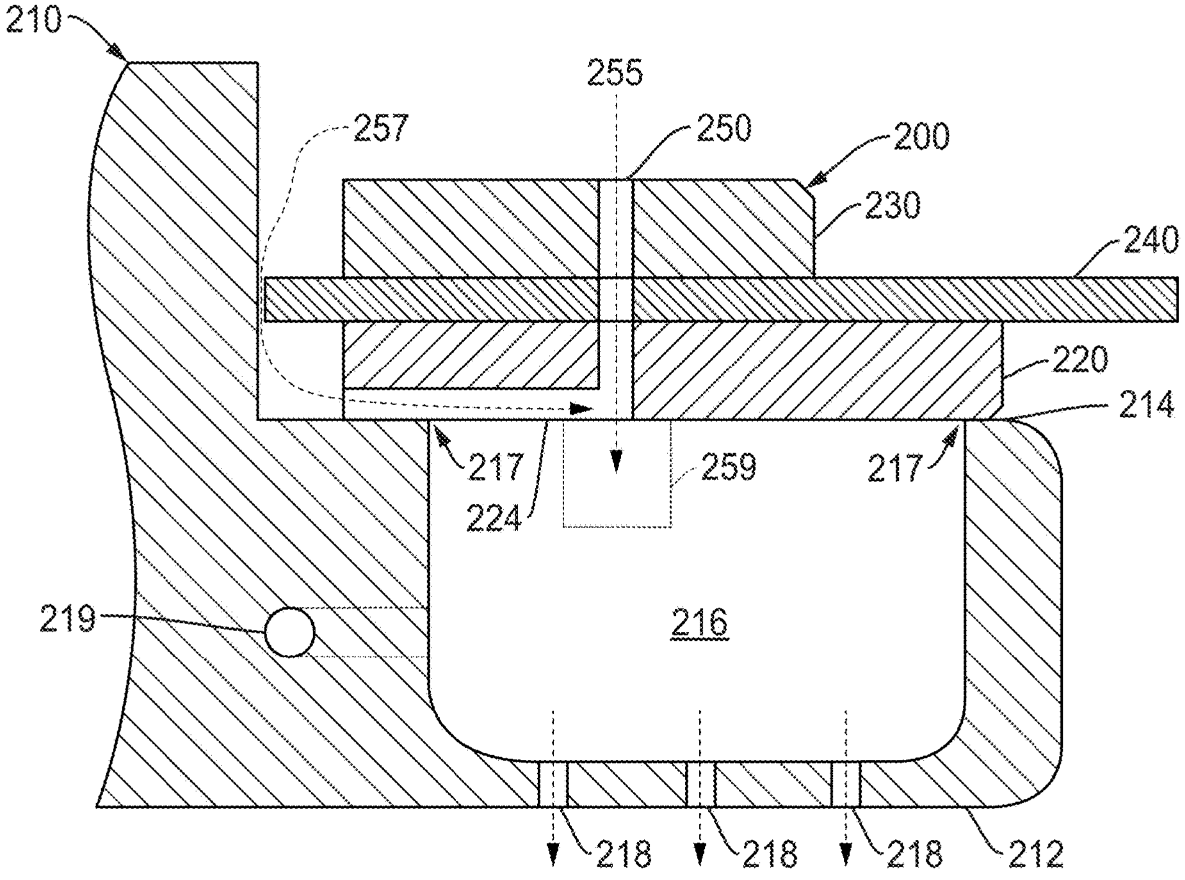
FIG. 2 schematically illustrates a partial cross section of an example embodiment of a brush seal with a cross-flow backing plate to reduce thermal gradients in accordance with the present disclosure.

With reference to FIG. 2, an embodiment of a brush seal 200 in accordance with the present disclosure is used with a CMC component 210 of a gas turbine engine, which in this example may be a CMC BOAS. The CMC component 210 has a hot side 212 configured for exposure to a hot gas path of the gas turbine engine and an opposing cold side 214 that has a cavity 216 formed therein for feeding a cooling flow to at least one film cooling hole 218 of the CMC component 210. The schematic cross section of FIG. 2 shows a contact of a radial brush seal 200, which may be formed as a split ring, and a segment of a CMC component 210. Accordingly, the elements illustrated herein for radial brush seal 200 may be repeated at other portions of the illustrated segment of CMC component 210 and/or in adjacent/other segments of CMC component 210.

The cavity 216 may have an open top that is covered by seal 200, and may be formed in CMC component 210 in any suitable manner, including but not limited to being initially formed in a preform or a partially-densified preform for inclusion in the densified CMC component, or being formed by machining and/or grinding of a densified CMC component. The brush seal 200 includes an inner diameter (ID) backing plate 220, an outer diameter (OD) backing plate 230, and a plurality of brush seal bristles 240 sandwiched between the ID backing plate 220 and the OD backing plate 230 and connected together by welding in a central welding zone. The ID backing plate 220, OD backing plate 230, and brush seal bristles 240 may be made of suitable metal alloys such as high-temperature Ni and Co alloys. When Ni alloys are used, a coating may be provided on contacting portions of the ID backing plate 220 or CMC component 210 for compatibility reasons.

The brush seal 200 contacts the cold side 214 of CMC component 210 to form a radial face seal 217. The brush seal 200 further includes at least one hole 250 forming a passage extending through the OD backing plate 230, the brush seal bristles 240, and the ID backing plate 220. The hole 250 may be any suitable channel and may be formed in the central welded zone of the brush seal 200. Although illustrated as a single passage for ease of illustration, multiple passages may also be formed without departing from the scope of the present disclosure. The hole 250 may have circular or non-circular (polygonal, elliptical, irregular, etc.) cross-section, may be straight or not (i.e., curved, segmented, etc.), and/or may vary in cross-section (e.g., expanding, contracting, or combinations thereof).

The hole 250 of brush seal 200 allows for the ingress of a film cooling air supply 255, which may flow through hole 250 and provide impingement cooling of the walls of cavity 216 that acts as a film cooling supply plenum to provide the film cooling air supply 255 to the at least one film cooling hole 218 provided in the hot side of CMC component 210. However, in accordance with the present disclosure, the ID backing plate 220 may have a cross-flow channel 224 disposed on an inner surface thereof to provide a cross-flow of cross-flow air 257 that has leaked past the brush seal bristles 240 of brush seal 200. One cross-flow channel 224 may be provided for each hole 250.

Cross-flow channel 224 extends across a portion of the face seal 217 from an edge of ID backing plate 220 to the hole 250, wherein cross-flow air 257 provided by cross-flow channel 224 may mix with film cooling air supply 255 at a mixing zone 259 so as to reduce the impingement cooling effectiveness of the film cooling air supply 255 (i.e., reduce the heat transfer coefficient of jet impingement acting on CMC non-gas path surfaces). The cross-flow channel 224 may be, for example, machined into the inner surface of ID backing plate 220, and the size may be tailored to have the desired amount of mixing in mixing zone 259.

In the illustrated example of FIG. 2, the cavity 216 acts as a plenum for a plurality of film cooling holes 218 extending from the cavity to the hot side 212 of the CMC BOAS 210, however, embodiments are not limited thereto. In one or more other embodiments, cavity 216 may include at least one conduit 219, which may lead to another portion of the CMC BOAS 210, to an adjacent region of the turbine engine, and/or to a mateface purge hole.

Figure 3:
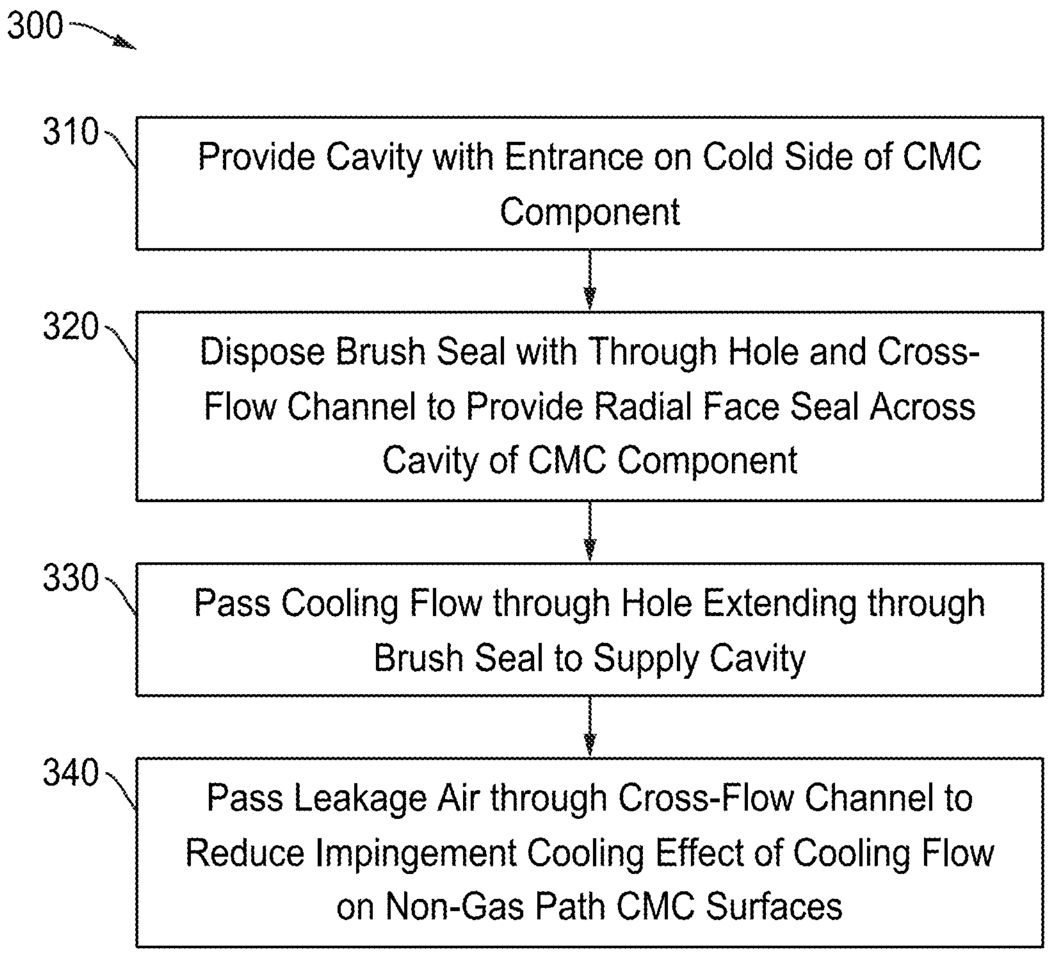
FIG. 3 is a flow diagram of an example process in accordance with the present disclosure.

FIG. 3 is a schematic flow diagram of a method 300 of providing a cooling flow to a CMC component of a turbine engine through a brush seal. In method 300, the CMC component has a hot side configured for exposure to a hot gas path of the turbine engine and an opposing cold side.

Method 300 includes a step 310 of providing at least one cavity in the CMC component, the at least one cavity having an entrance disposed on the cold side for receiving the cooling flow.

In a next step 320, the method 300 includes disposing the brush seal with the through hole for cooling air and the cross-flow channel adjacent the at least one cavity and the cold side of the CMC component to provide a radial face seal across the cavity of the CMC component.

Method 300 further includes step 330 of passing the cooling flow from a source through the hole extending through the brush seal to provide the cooling flow to the at least one cavity of the CMC component, such as for providing the flow to film cooling holes in the hot side of the CMC component. The cooling flow may also be used for supplying mateface purge holes or supplying other cooling circuits in the CMC component or an adjacent component.

In a step 340, leakage air that has passed through the bristles of the brush seal is passed through the cross-flow channel to the exit of the hole and mixes with the cooling flow to reduce the impingement cooling effect of the cooling flow on non-gas path surfaces of the CMC component.

In one or more embodiments, the step 310 of providing at least one cavity in the CMC component may include providing a film cooling supply plenum. In such embodiments, the step 330 of passing the cooling flow through the at least one hole feeds a plurality of film cooling holes extending to the hot side of the CMC component to provide film cooling.

Embodiments in accordance with the present disclosure may enhance the durability and structural capabilities of film-cooled CMC components by enabling film cooling while minimizing thermal gradients across the component's CMC substrate. Were non-gas path impingement effects not mitigated through the use of embodiments of the present disclosure, a film-cooled CMC part would experience stronger thermal gradients that could lead to crack formation, coating spallation, or other non-desirable consequences. Embodiments in accordance with the present disclosure reduce thermally-driven stresses by controlling thermal gradient. A brush seal with a crossflow backing plate allows for such a configuration of CMC hardware to operate at higher temperatures with thermally-driven stresses reduced.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A brush seal for a ceramic matrix composite (CMC) component of a turbine engine, the CMC component having a hot side configured for exposure to a hot gas path of the turbine engine and an opposing cold side, comprising:

an inner diameter (ID) backing plate configured to provide a radial face seal across a cavity in the CMC component;

an outer diameter (OD) backing plate;

a plurality of brush seal bristles disposed between the ID backing plate and OD backing plate;

a hole extending through the OD backing plate, the brush seal bristles, and the ID backing plate and positioned to provide the cooling flow to the cavity of the CMC component; and a cross-flow channel disposed on an inner surface of the ID backing plate, the cross-flow channel extending from an edge of the ID backing plate to the hole.

2. The brush seal of claim 1, wherein the hole is round.

3. The brush seal of claim 1, wherein the cross-flow channel is machined into the inner surface of the ID backing plate.

4. The brush seal of claim 1, wherein the cross-flow channel extends across a portion of the radial face seal.

5. The brush seal of claim 1, wherein the cross-flow channel is dimensioned to provide leakage air that leaks past the brush seal bristles.

6. The brush seal of claim 5, wherein the cross-flow channel is configured to cause the leakage air to transversely mix with cooling air from the hole to lower a heat transfer coefficient of the cooling air.

7. The brush seal of claim 1, wherein the cavity forms a plenum which feeds a plurality of film cooling holes extending to the hot side of the CMC component.

8. The brush seal of claim 7, wherein the plenum further feeds a cooling flow for a mateface purge hole in the CMC component.

9. The brush seal of claim 7, wherein the plenum further feeds a cooling flow for an additional cooling circuit in the CMC component or an adjacent CMC component.

10. The brush seal of claim 1, wherein the brush seal is configured to form the face seal against the CMC component selected from a CMC blade outer air seal (BOAS), a CMC vane platform, or a CMC combustion liner.

* * * * *